United States Patent
Sharma et al.

(10) Patent No.: US 11,853,100 B2
(45) Date of Patent: Dec. 26, 2023

(54) AUTOMATED DELIVERY OF CLOUD NATIVE APPLICATION UPDATES USING ONE OR MORE USER-CONNECTION GATEWAYS

(71) Applicant: EMC IP Holding Company LLC, Hopkinton, MA (US)

(72) Inventors: Anurag Sharma, Cedar Park, TX (US); Jeffrey T. Glenn, Pflugerville, TX (US); Matt Puerkel, Minneapolis, MN (US); Eddie Pavkovic, Westford, MA (US); Aaron W. Spiegel, Stilwell, KS (US)

(73) Assignee: EMC IP Holding Company LLC, Hopkinton, MA (US)

( * ) Notice: Subject to any disclaimer, the term of this patent is extended or adjusted under 35 U.S.C. 154(b) by 171 days.

(21) Appl. No.: 17/227,644

(22) Filed: Apr. 12, 2021

(65) Prior Publication Data

US 2022/0326929 A1 Oct. 13, 2022

(51) Int. Cl.
*G06F 8/65* (2018.01)
*H04L 9/40* (2022.01)
(Continued)

(52) U.S. Cl.
CPC ............ *G06F 8/65* (2013.01); *G06F 9/44505* (2013.01); *G06F 21/577* (2013.01);
(Continued)

(58) Field of Classification Search
None
See application file for complete search history.

(56) References Cited

U.S. PATENT DOCUMENTS

| | | | |
|---|---|---|---|
| 8,639,921 B1 * | 1/2014 | Sorenson, III | .......... H04L 63/02 713/153 |
| 8,639,989 B1 * | 1/2014 | Sorenson, III | ...... G06F 11/2071 709/224 |

(Continued)

FOREIGN PATENT DOCUMENTS

CN 110222517 A * 9/2019

OTHER PUBLICATIONS

Google Translation of CN-10222517A, pp. 1-9 (Year: 2019).*

(Continued)

*Primary Examiner* — Luu T Pham
*Assistant Examiner* — James J Wilcox
(74) *Attorney, Agent, or Firm* — Ryan, Mason & Lewis, LLP

(57) ABSTRACT

Methods, apparatus, and processor-readable storage media for automated delivery of cloud native application updates using one or more user-connection gateways are provided herein. An example computer-implemented method includes generating an application update package pertaining to a cloud native application; generating a manifest file comprising identifying information for the application update package and metadata pertaining to implementing the application update package; outputting, to a user device via a user-connection gateway, a request for automated remote action on an application within a user environment associated with the user device; processing, via the user-connection gateway, a response from the user device approving the request for automated remote action; outputting the manifest file to the user environment associated with the user device; and initiating, in accordance with the manifest file, automated implementation of the application update package to the application within the user environment.

20 Claims, 8 Drawing Sheets

(51) Int. Cl.
   *H04L 67/06* (2022.01)
   *G06F 21/57* (2013.01)
   *G06F 9/445* (2018.01)
   *H04L 67/00* (2022.01)

(52) U.S. Cl.
   CPC .......... *H04L 63/029* (2013.01); *H04L 63/062* (2013.01); *H04L 63/08* (2013.01); *H04L 67/06* (2013.01); *G06F 2221/033* (2013.01); *H04L 67/34* (2013.01)

(56) References Cited

U.S. PATENT DOCUMENTS

| | | | | |
|---|---|---|---|---|
| 9,036,509 | B1* | 5/2015 | Addepalli | H04W 72/20 701/1 |
| 9,325,791 | B1* | 4/2016 | Blahaerath | G06F 3/0631 |
| 9,590,872 | B1* | 3/2017 | Jagtap | H04L 41/0886 |
| 9,604,651 | B1* | 3/2017 | Amireddy | H04L 12/4625 |
| 9,612,815 | B1* | 4/2017 | Jagtap | G06F 8/61 |
| 9,626,176 | B2* | 4/2017 | Thomas | G06F 8/658 |
| 9,635,132 | B1* | 4/2017 | Lin | H04L 67/1097 |
| 9,665,359 | B2* | 5/2017 | Thomas | G06F 8/62 |
| 9,680,967 | B2* | 6/2017 | Kim | H04L 67/01 |
| 9,754,303 | B1* | 9/2017 | Jagtap | G06Q 30/0603 |
| 9,781,122 | B1* | 10/2017 | Wilson | H04L 63/08 |
| 9,830,142 | B2* | 11/2017 | Thomas | G06F 11/3696 |
| 9,891,907 | B2* | 2/2018 | Searle | H04L 41/082 |
| 9,922,322 | B2* | 3/2018 | Flurscheim | H04L 9/088 |
| 9,972,005 | B2* | 5/2018 | Wong | G06Q 20/322 |
| 10,026,064 | B2* | 7/2018 | Thomas | G06F 9/44505 |
| 10,049,353 | B2* | 8/2018 | Lopez | G06Q 20/326 |
| 10,057,243 | B1* | 8/2018 | Kumar | H04L 63/0823 |
| 10,250,438 | B2* | 4/2019 | Asenjo | H04L 43/0817 |
| 10,419,540 | B2* | 9/2019 | Arora | H04L 67/10 |
| 10,452,375 | B1* | 10/2019 | Nightingale | G06F 21/53 |
| 10,470,059 | B1* | 11/2019 | Annambhotla | H04W 4/021 |
| 10,484,334 | B1* | 11/2019 | Lee | H04L 67/30 |
| 10,503,493 | B2* | 12/2019 | Narayanan | G06F 9/45558 |
| 10,606,576 | B1* | 3/2020 | Tung | G06F 16/172 |
| 10,635,643 | B2* | 4/2020 | Muthuswamy | G06F 16/13 |
| 10,705,823 | B2* | 7/2020 | Pitre | H04L 41/5054 |
| 10,831,452 | B1* | 11/2020 | Hunter | G06N 3/086 |
| 10,841,152 | B1* | 11/2020 | Humphreys | H04L 67/10 |
| 10,855,619 | B1* | 12/2020 | Andrews | H04L 63/20 |
| 10,887,672 | B1* | 1/2021 | Wu | G06V 30/248 |
| 10,922,284 | B1* | 2/2021 | Venkatasubramanian | H04L 63/0807 |
| 10,924,275 | B1* | 2/2021 | Kumar | H04L 9/14 |
| 10,938,954 | B2 | 3/2021 | Lee et al. | |
| 10,938,957 | B1* | 3/2021 | Rajagopalan | H04L 67/10 |
| 10,963,565 | B1* | 3/2021 | Xu | G06F 21/55 |
| 10,990,369 | B2* | 4/2021 | Natanzon | G06F 11/3696 |
| 11,003,630 | B2* | 5/2021 | Demaris | G06Q 50/01 |
| 11,082,361 | B2* | 8/2021 | Laplanche | G06F 9/5072 |
| 11,119,754 | B1* | 9/2021 | Sun | G06F 8/65 |
| 11,190,589 | B1* | 11/2021 | Ron | H04L 63/12 |
| 11,196,785 | B2* | 12/2021 | Cenzano Ferret | H04L 65/612 |
| 11,218,421 | B1* | 1/2022 | Khan | H04L 41/122 |
| 11,316,794 | B1* | 4/2022 | Savguira | H04L 47/25 |
| 11,327,992 | B1* | 5/2022 | Batsakis | H04L 63/063 |
| 11,372,634 | B1* | 6/2022 | Gabrielson | H04L 67/1031 |
| 11,409,709 | B1* | 8/2022 | Capello | G06F 16/1873 |
| 11,418,851 | B1* | 8/2022 | Gerstl | H04N 21/44008 |
| 11,431,497 | B1* | 8/2022 | Liguori | H04L 9/0897 |
| 11,435,810 | B1* | 9/2022 | Krishnakumar | G06F 1/3278 |
| 11,487,513 | B1* | 11/2022 | Hanson | G06F 8/36 |
| 11,522,812 | B1* | 12/2022 | Thoppai | H04L 47/781 |
| 11,544,046 | B1* | 1/2023 | Zhang | G06F 8/427 |
| 11,550,903 | B1* | 1/2023 | Epstein | G06F 21/577 |
| 11,573,816 | B1* | 2/2023 | Featonby | H04L 67/10 |
| 11,593,477 | B1* | 2/2023 | Thimmegowda | G06F 21/552 |
| 11,640,374 | B2* | 5/2023 | Shaw | G06F 16/178 707/620 |
| 11,662,928 | B1* | 5/2023 | Kumar | H04L 9/0894 713/150 |
| 11,665,645 | B2* | 5/2023 | Krishnakumar | G06F 3/038 370/311 |
| 11,789,728 | B2* | 10/2023 | Dasa | G06F 9/45529 717/120 |
| 2003/0055985 | A1* | 3/2003 | Corb | H04M 7/003 709/227 |
| 2010/0061250 | A1* | 3/2010 | Nugent | H04L 41/5045 370/242 |
| 2011/0145272 | A1* | 6/2011 | Grzybowski | H04L 67/306 718/1 |
| 2011/0145591 | A1* | 6/2011 | Grzybowski | G06F 9/4451 718/1 |
| 2011/0145817 | A1* | 6/2011 | Grzybowski | G06F 9/45533 718/1 |
| 2012/0110173 | A1* | 5/2012 | Luna | H04L 67/145 709/224 |
| 2012/0159468 | A1* | 6/2012 | Joshi | G06F 8/71 717/172 |
| 2012/0266156 | A1* | 10/2012 | Spivak | G06F 8/65 717/172 |
| 2012/0266168 | A1* | 10/2012 | Spivak | H04L 67/10 718/1 |
| 2012/0297190 | A1* | 11/2012 | Shen | H04L 9/0866 713/168 |
| 2013/0007183 | A1* | 1/2013 | Sorenson, III | G06F 3/0632 709/213 |
| 2013/0007854 | A1* | 1/2013 | Sorenson, III | H04L 63/10 713/170 |
| 2013/0054863 | A1* | 2/2013 | Imes | H04L 47/70 709/223 |
| 2013/0097687 | A1* | 4/2013 | Storm | H04L 63/0807 726/9 |
| 2013/0144879 | A1* | 6/2013 | Kuehnel | H04L 47/34 707/736 |
| 2013/0227089 | A1* | 8/2013 | McLeod | G06F 9/45558 709/220 |
| 2013/0275623 | A1* | 10/2013 | Stoilov | G06F 8/61 709/246 |
| 2013/0283254 | A1* | 10/2013 | Ocher | G06F 8/65 717/170 |
| 2013/0305039 | A1* | 11/2013 | Gauda | G06F 21/6272 713/153 |
| 2013/0347094 | A1* | 12/2013 | Bettini | H04L 63/1433 726/11 |
| 2014/0025424 | A1* | 1/2014 | Juillard | G06Q 10/06316 705/7.26 |
| 2014/0033188 | A1* | 1/2014 | Beavers | G06F 8/65 717/170 |
| 2014/0052330 | A1* | 2/2014 | Mitchell | G06F 8/65 701/31.5 |
| 2014/0075035 | A1* | 3/2014 | Revanuru | G06F 9/5072 709/226 |
| 2014/0075426 | A1* | 3/2014 | West | G06F 8/65 717/171 |
| 2014/0075427 | A1* | 3/2014 | Pallamreddy | G06F 8/65 717/172 |
| 2014/0075520 | A1* | 3/2014 | Subramanian | H04L 63/101 726/4 |
| 2014/0146055 | A1* | 5/2014 | Bala | G06F 8/63 345/501 |
| 2014/0149492 | A1* | 5/2014 | Ananthanarayanan | H04L 67/1034 709/203 |
| 2014/0149494 | A1* | 5/2014 | Markley | H04W 4/60 709/203 |
| 2014/0149591 | A1* | 5/2014 | Bhattacharya | G06F 9/5072 709/226 |
| 2014/0149983 | A1* | 5/2014 | Bonilla | G06F 3/0619 718/1 |
| 2014/0195653 | A1* | 7/2014 | Alexander | H04N 21/2181 709/219 |
| 2014/0208314 | A1* | 7/2014 | Jeswani | G06F 9/45533 718/1 |
| 2014/0245423 | A1* | 8/2014 | Lee | H04L 63/20 726/12 |

(56) References Cited

U.S. PATENT DOCUMENTS

| | | | |
|---|---|---|---|
| 2014/0274408 A1* | 9/2014 | Dave | G06F 9/5038 463/42 |
| 2014/0351871 A1* | 11/2014 | Bomfim | H04L 65/612 725/93 |
| 2015/0007094 A1* | 1/2015 | LaTurner | G06F 3/0481 715/780 |
| 2015/0033305 A1* | 1/2015 | Shear | G06F 21/6218 726/11 |
| 2015/0039556 A1* | 2/2015 | Mackenzie | G06F 16/1767 707/608 |
| 2015/0058435 A1* | 2/2015 | Chumbley | G06F 16/9574 709/213 |
| 2015/0088934 A1* | 3/2015 | Beckman | H04L 63/0428 707/781 |
| 2015/0089673 A1* | 3/2015 | Beckman | H04L 63/10 726/29 |
| 2015/0235042 A1* | 8/2015 | Salehpour | G06F 21/44 726/4 |
| 2015/0242198 A1* | 8/2015 | Tobolski | H04L 67/34 717/172 |
| 2015/0242237 A1* | 8/2015 | Spivak | G06F 8/71 718/1 |
| 2015/0276208 A1* | 10/2015 | Maturana | G05B 13/04 700/274 |
| 2015/0277399 A1* | 10/2015 | Maturana | G06F 9/5072 700/29 |
| 2015/0277404 A1* | 10/2015 | Maturana | G06F 9/451 700/83 |
| 2015/0278354 A1* | 10/2015 | Morrey | G06F 16/2465 707/723 |
| 2015/0281233 A1* | 10/2015 | Asenjo | G06F 21/44 726/7 |
| 2015/0281319 A1* | 10/2015 | Maturana | G05B 19/4185 709/202 |
| 2015/0355895 A1* | 12/2015 | Giammaria | G06F 11/3688 717/169 |
| 2015/0373149 A1* | 12/2015 | Lyons | H04L 12/2829 709/203 |
| 2015/0381662 A1* | 12/2015 | Nair | H04L 63/20 726/1 |
| 2016/0021197 A1* | 1/2016 | Pogrebinsky | H04L 67/51 709/226 |
| 2016/0077869 A1* | 3/2016 | Grueneberg | H04L 67/10 718/1 |
| 2016/0094427 A1* | 3/2016 | Talat | H04L 69/16 709/250 |
| 2016/0098262 A1* | 4/2016 | Spivak | G06F 8/658 717/170 |
| 2016/0098263 A1* | 4/2016 | Spivak | G06F 8/71 717/170 |
| 2016/0117160 A1* | 4/2016 | Parthasarathy | H04L 67/06 717/171 |
| 2016/0117161 A1* | 4/2016 | Parthasarathy | H04L 67/06 717/171 |
| 2016/0117162 A1* | 4/2016 | Searle | H04L 41/0893 717/173 |
| 2016/0191509 A1* | 6/2016 | Bestler | H04L 63/0876 713/193 |
| 2016/0196131 A1* | 7/2016 | Searle | H04L 65/40 717/173 |
| 2016/0196132 A1* | 7/2016 | Searle | G06F 8/65 717/173 |
| 2016/0212122 A1* | 7/2016 | Carroll | G06F 21/44 |
| 2016/0219043 A1* | 7/2016 | Blanke | H04L 9/3263 |
| 2016/0238272 A1* | 8/2016 | Imes | H04W 84/10 |
| 2016/0285904 A1* | 9/2016 | Ye | H04L 63/1425 |
| 2016/0291940 A1* | 10/2016 | Searle | H04L 67/303 |
| 2016/0291959 A1* | 10/2016 | Searle | H04L 41/082 |
| 2016/0294605 A1* | 10/2016 | Searle | H04L 41/069 |
| 2016/0294614 A1* | 10/2016 | Searle | H04L 67/34 |
| 2016/0321455 A1* | 11/2016 | Deng | G06F 3/0685 |
| 2017/0041296 A1* | 2/2017 | Ford | G06F 21/64 |
| 2017/0046146 A1* | 2/2017 | Jamjoom | G06F 8/62 |
| 2017/0054760 A1* | 2/2017 | Barton | G06F 21/54 |
| 2017/0090912 A1* | 3/2017 | Fuglsang | G06F 8/30 |
| 2017/0124340 A1* | 5/2017 | Chiu | H04L 67/10 |
| 2017/0156149 A1* | 6/2017 | Lin | H04W 4/021 |
| 2017/0208053 A1* | 7/2017 | Sanghamitra | H04L 63/102 |
| 2017/0244754 A1* | 8/2017 | Kinder | G06F 21/552 |
| 2017/0244762 A1* | 8/2017 | Kinder | H04L 63/1466 |
| 2017/0245280 A1* | 8/2017 | Yi | H04K 3/00 |
| 2017/0249132 A1* | 8/2017 | Andrews | H04L 63/062 |
| 2017/0331791 A1* | 11/2017 | Wardell | H04W 12/062 |
| 2017/0331802 A1* | 11/2017 | Keshava | H04L 9/0894 |
| 2017/0331812 A1* | 11/2017 | Lander | H04L 63/0815 |
| 2017/0331813 A1* | 11/2017 | Lander | H04L 63/0815 |
| 2017/0331829 A1* | 11/2017 | Lander | G06F 21/6218 |
| 2017/0331832 A1* | 11/2017 | Lander | H04L 63/102 |
| 2017/0364345 A1* | 12/2017 | Fontoura | G06F 9/52 |
| 2017/0364686 A1* | 12/2017 | Stafford | G06F 8/65 |
| 2018/0006913 A1* | 1/2018 | Asenjo | H04L 41/0856 |
| 2018/0007069 A1* | 1/2018 | Hunt | H04L 63/1408 |
| 2018/0034789 A1* | 2/2018 | Gaydos | H04L 63/0281 |
| 2018/0039494 A1* | 2/2018 | Lander | H04L 45/02 |
| 2018/0039501 A1* | 2/2018 | Jain | H04L 43/045 |
| 2018/0041491 A1* | 2/2018 | Gupta | G06F 9/547 |
| 2018/0041515 A1* | 2/2018 | Gupta | H04L 63/0815 |
| 2018/0063143 A1* | 3/2018 | Wilson | H04L 63/0281 |
| 2018/0063594 A1* | 3/2018 | Alexander | H04N 21/23439 |
| 2018/0075231 A1* | 3/2018 | Subramanian | H04L 63/0807 |
| 2018/0077138 A1* | 3/2018 | Bansal | G06Q 20/325 |
| 2018/0077144 A1* | 3/2018 | Gangawane | H04L 63/102 |
| 2018/0077219 A1* | 3/2018 | Tan | H04N 21/21815 |
| 2018/0081983 A1* | 3/2018 | Carru | H04L 63/0815 |
| 2018/0083826 A1* | 3/2018 | Wilson | H04L 63/0815 |
| 2018/0083915 A1* | 3/2018 | Medam | G06F 16/2246 |
| 2018/0083944 A1* | 3/2018 | Vats | G06F 16/9027 |
| 2018/0083967 A1* | 3/2018 | Subramanian | H04L 63/10 |
| 2018/0083980 A1* | 3/2018 | Bond | G06F 21/604 |
| 2018/0089224 A1* | 3/2018 | Muthuswamy | G06F 16/13 |
| 2018/0114025 A1* | 4/2018 | Cui | G06F 8/65 |
| 2018/0130240 A1* | 5/2018 | Mall | G06F 40/194 |
| 2018/0137299 A1* | 5/2018 | Porter | G06F 21/64 |
| 2018/0167490 A1* | 6/2018 | Morton | G06F 3/167 |
| 2018/0181761 A1* | 6/2018 | Sinha | G06F 21/577 |
| 2018/0232223 A1* | 8/2018 | Madrid | G06F 8/71 |
| 2018/0248915 A1* | 8/2018 | Beckman | G06F 21/62 |
| 2018/0262388 A1* | 9/2018 | Johnson | H04L 63/0823 |
| 2018/0307502 A1* | 10/2018 | Crasta | G06F 9/44505 |
| 2018/0321934 A1* | 11/2018 | Chaganti | G06F 8/61 |
| 2018/0337914 A1* | 11/2018 | Mohamad Abdul | H04L 9/3213 |
| 2018/0367314 A1* | 12/2018 | Egner | H04L 63/107 |
| 2018/0373434 A1* | 12/2018 | Switzer | H04L 67/1095 |
| 2019/0007354 A1* | 1/2019 | Bulut | G16H 50/20 |
| 2019/0018394 A1* | 1/2019 | Sayyarrodsari | G05B 19/41885 |
| 2019/0042228 A1* | 2/2019 | Nolan | G06F 8/64 |
| 2019/0044914 A1* | 2/2019 | Kleiner | H04L 63/10 |
| 2019/0050217 A1* | 2/2019 | Tatourian | G06F 8/65 |
| 2019/0050414 A1* | 2/2019 | Maturana | G06F 8/38 |
| 2019/0052551 A1* | 2/2019 | Barczynski | H04L 41/40 |
| 2019/0057218 A1* | 2/2019 | Bhaskara | H04L 67/1097 |
| 2019/0058718 A1* | 2/2019 | Pangeni | H04L 63/1425 |
| 2019/0064787 A1* | 2/2019 | Maturana | G05B 23/0227 |
| 2019/0089809 A1* | 3/2019 | Theebaprakasam | G06F 9/542 |
| 2019/0095516 A1* | 3/2019 | Srinivasan | H04L 63/102 |
| 2019/0102162 A1* | 4/2019 | Pitre | H04L 63/104 |
| 2019/0102797 A1* | 4/2019 | Yang | G09F 9/00 |
| 2019/0107830 A1* | 4/2019 | Duraisingh | G05B 23/0264 |
| 2019/0107831 A1* | 4/2019 | Duraisingh | G05B 23/0264 |
| 2019/0107832 A1* | 4/2019 | Strand | G05B 23/0264 |
| 2019/0108013 A1* | 4/2019 | Duraisingh | H04L 43/0817 |
| 2019/0109725 A1* | 4/2019 | Duraisingh | H04L 12/2812 |
| 2019/0109907 A1* | 4/2019 | Duraisingh | H04L 67/125 |
| 2019/0124144 A1* | 4/2019 | Isci | H04L 67/1012 |
| 2019/0125361 A1* | 5/2019 | Shelton, IV | A61B 90/30 |
| 2019/0125454 A1* | 5/2019 | Stokes | A61B 90/98 |
| 2019/0125455 A1* | 5/2019 | Shelton, IV | A61B 17/07207 |
| 2019/0125456 A1* | 5/2019 | Shelton, IV | A61B 17/07207 |
| 2019/0125457 A1* | 5/2019 | Parihar | A61B 34/10 |
| 2019/0125458 A1* | 5/2019 | Shelton, IV | A61B 17/072 |

(56) References Cited

U.S. PATENT DOCUMENTS

| | | | |
|---|---|---|---|
| 2019/0125459 A1* | 5/2019 | Shelton, IV | G16H 40/63 |
| 2019/0156028 A1* | 5/2019 | Hay | G06F 21/563 |
| 2019/0163912 A1* | 5/2019 | Kumar | H04L 9/0891 |
| 2019/0171438 A1* | 6/2019 | Franchitti | G06N 20/00 |
| 2019/0188107 A1* | 6/2019 | Alston | G06F 9/45558 |
| 2019/0197786 A1* | 6/2019 | Molyneaux | G06T 15/405 |
| 2019/0200977 A1* | 7/2019 | Shelton, IV | A61B 17/068 |
| 2019/0201136 A1* | 7/2019 | Shelton, IV | G16H 50/20 |
| 2019/0205317 A1* | 7/2019 | Tobias | G06F 40/174 |
| 2019/0206562 A1* | 7/2019 | Shelton, IV | A61B 17/0206 |
| 2019/0206565 A1* | 7/2019 | Shelton, IV | A61B 90/37 |
| 2019/0207866 A1* | 7/2019 | Pathak | H04L 41/12 |
| 2019/0213104 A1* | 7/2019 | Qadri | G06F 11/3608 |
| 2019/0230130 A1* | 7/2019 | Beckman | H04L 67/565 |
| 2019/0236282 A1* | 8/2019 | Hulick, Jr. | G06F 16/951 |
| 2019/0238598 A1* | 8/2019 | Mohamad Abdul | H04L 63/0807 |
| 2019/0258782 A1* | 8/2019 | Lerner | G07C 9/257 |
| 2019/0265843 A1* | 8/2019 | Zhao | G06F 9/451 |
| 2019/0268420 A1* | 8/2019 | Acharya | H04L 63/166 |
| 2019/0306010 A1* | 10/2019 | Medam | G06F 9/546 |
| 2019/0306138 A1* | 10/2019 | Carru | H04L 41/28 |
| 2019/0312857 A1* | 10/2019 | Lander | G06F 9/5072 |
| 2019/0319785 A1* | 10/2019 | Kumar | H04L 9/14 |
| 2019/0349213 A1* | 11/2019 | Shive | G05B 15/02 |
| 2019/0356693 A1* | 11/2019 | Cahana | H04L 67/1036 |
| 2019/0361411 A1* | 11/2019 | Park | H04L 67/12 |
| 2019/0361412 A1* | 11/2019 | Park | H04L 12/2809 |
| 2019/0394204 A1* | 12/2019 | Bansal | H04L 63/0815 |
| 2020/0007530 A1* | 1/2020 | Mohamad Abdul | H04W 12/009 |
| 2020/0019471 A1* | 1/2020 | Natanzon | G06F 11/1469 |
| 2020/0024047 A1* | 1/2020 | McNannay | H05K 1/0269 |
| 2020/0074084 A1* | 3/2020 | Dorrans | G06F 21/577 |
| 2020/0082094 A1* | 3/2020 | Mcallister | G06F 8/77 |
| 2020/0082095 A1* | 3/2020 | Mcallister | G06F 11/323 |
| 2020/0097662 A1* | 3/2020 | Hufsmith | H04L 9/0643 |
| 2020/0125858 A1* | 4/2020 | Bauer | H04L 12/40189 |
| 2020/0177591 A1* | 6/2020 | Pogrebinsky | H04L 63/10 |
| 2020/0177652 A1* | 6/2020 | Halepovic | H04L 65/80 |
| 2020/0195525 A1* | 6/2020 | Fitzer | H04L 41/5048 |
| 2020/0203021 A1* | 6/2020 | Torrance | G06F 3/0483 |
| 2020/0213357 A1* | 7/2020 | Levin | H04L 41/0813 |
| 2020/0222010 A1* | 7/2020 | Howard | G06N 5/02 |
| 2020/0250664 A1* | 8/2020 | Kumar | G06F 21/41 |
| 2020/0257514 A1* | 8/2020 | Gadgil | H04L 67/34 |
| 2020/0257518 A1* | 8/2020 | Liedtke | G06F 21/572 |
| 2020/0257700 A1* | 8/2020 | Xu | G06F 8/65 |
| 2020/0264860 A1* | 8/2020 | Srinivasan | G06F 8/65 |
| 2020/0265062 A1* | 8/2020 | Srinivasan | G06F 16/1844 |
| 2020/0265168 A1* | 8/2020 | Acun | G06F 21/44 |
| 2020/0274900 A1* | 8/2020 | Vaishnavi | H04L 63/0815 |
| 2020/0280568 A1* | 9/2020 | Bratspiess | H04L 63/1433 |
| 2020/0285457 A1* | 9/2020 | Meriac | H04L 67/34 |
| 2020/0285461 A1* | 9/2020 | Kumar | G06F 8/65 |
| 2020/0287793 A1* | 9/2020 | Buck | H04L 41/0806 |
| 2020/0319873 A1* | 10/2020 | Kaartinen | H04L 41/082 |
| 2020/0326931 A1* | 10/2020 | Nadgowda | H04L 41/085 |
| 2020/0327371 A1* | 10/2020 | Sharma | H04L 67/34 |
| 2020/0334027 A1* | 10/2020 | Kalaskar | G06F 8/65 |
| 2020/0364953 A1* | 11/2020 | Simoudis | G06N 5/022 |
| 2020/0366655 A1* | 11/2020 | Sun | H04L 63/0807 |
| 2020/0371782 A1* | 11/2020 | Baierlein | G06F 11/3608 |
| 2020/0372718 A1* | 11/2020 | Molyneaux | G06T 19/006 |
| 2020/0374121 A1* | 11/2020 | Momchilov | H04L 9/0825 |
| 2020/0374136 A1* | 11/2020 | Momchilov | H04L 9/0819 |
| 2020/0374225 A1* | 11/2020 | Momchilov | H04L 63/0876 |
| 2020/0374284 A1* | 11/2020 | Suresh | H04L 63/10 |
| 2020/0374351 A1* | 11/2020 | Momchilov | H04L 67/14 |
| 2020/0379744 A1* | 12/2020 | Bhupati | H04L 67/61 |
| 2020/0379746 A1* | 12/2020 | Shivashankara | H04L 63/10 |
| 2020/0382365 A1* | 12/2020 | Verma | H04L 63/0272 |
| 2020/0387357 A1* | 12/2020 | Mathon | G06F 9/4411 |
| 2020/0405204 A1* | 12/2020 | Howard | A61B 5/14546 |
| 2020/0410106 A1* | 12/2020 | Nadgowda | G06F 21/566 |
| 2020/0410766 A1* | 12/2020 | Swaminathan | G06T 17/00 |
| 2021/0020012 A1* | 1/2021 | Shakedd | G06K 19/0708 |
| 2021/0021609 A1* | 1/2021 | Smith | G06F 8/60 |
| 2021/0027608 A1* | 1/2021 | Shakedd | G08B 21/24 |
| 2021/0064347 A1 | 3/2021 | Junior et al. | |
| 2021/0073282 A1* | 3/2021 | Hunter | G06F 9/542 |
| 2021/0081188 A1* | 3/2021 | Rajagopalan | G06F 8/65 |
| 2021/0081252 A1* | 3/2021 | Bhargava | G06F 9/5072 |
| 2021/0084031 A1* | 3/2021 | Lao | H04W 12/06 |
| 2021/0089662 A1* | 3/2021 | Muniswamy-Reddy | H04L 63/166 |
| 2021/0089685 A1* | 3/2021 | Cheruvu | G06F 21/54 |
| 2021/0117251 A1* | 4/2021 | Cristofi | G06F 9/542 |
| 2021/0117859 A1* | 4/2021 | Rogers | G06N 3/045 |
| 2021/0133318 A1* | 5/2021 | Andrews | G06F 11/3055 |
| 2021/0133329 A1* | 5/2021 | Andrews | G06F 21/577 |
| 2021/0133607 A1* | 5/2021 | Stubbs | G06N 20/00 |
| 2021/0136002 A1* | 5/2021 | Chandran | H04L 47/724 |
| 2021/0136082 A1* | 5/2021 | Andrews | H04L 63/105 |
| 2021/0138249 A1* | 5/2021 | Howard | A61N 1/36082 |
| 2021/0160231 A1* | 5/2021 | Kumar | H04L 63/0815 |
| 2021/0174952 A1* | 6/2021 | Leong | G16H 50/20 |
| 2021/0176210 A1* | 6/2021 | Chan | G06F 8/65 |
| 2021/0192867 A1* | 6/2021 | Fang | G07C 5/0816 |
| 2021/0226987 A1* | 7/2021 | Summers | H04L 67/306 |
| 2021/0232439 A1* | 7/2021 | Fong | G06F 9/5083 |
| 2021/0256833 A1* | 8/2021 | Daoura | H04W 4/021 |
| 2021/0303164 A1* | 9/2021 | Grunwald | G06F 3/0629 |
| 2021/0334082 A1* | 10/2021 | Su | G06F 8/65 |
| 2021/0349706 A1* | 11/2021 | Spivak | G06F 8/658 |
| 2021/0351948 A1* | 11/2021 | Lewis | H04L 41/12 |
| 2021/0373873 A1* | 12/2021 | Styles | G06F 8/65 |
| 2021/0389954 A1* | 12/2021 | Sommers | G06F 16/9017 |
| 2021/0397712 A1* | 12/2021 | Gajananan | G06F 21/64 |
| 2022/0019453 A1* | 1/2022 | Okada | G06F 9/45558 |
| 2022/0027483 A1* | 1/2022 | Hetzler | G06F 21/602 |
| 2022/0036206 A1* | 2/2022 | Vacchi | G06F 9/546 |
| 2022/0040534 A1* | 2/2022 | Imes | G06V 10/10 |
| 2022/0075782 A1* | 3/2022 | Hines | G06F 16/211 |
| 2022/0075825 A1* | 3/2022 | Helms | H04L 9/3234 |
| 2022/0078149 A1* | 3/2022 | Hines | H04L 63/0428 |
| 2022/0078209 A1* | 3/2022 | V | H04L 63/105 |
| 2022/0078797 A1* | 3/2022 | Helms | G06F 3/02 |
| 2022/0083251 A1* | 3/2022 | Saad | H04L 69/14 |
| 2022/0091858 A1* | 3/2022 | Chivukula | H04L 41/40 |
| 2022/0095079 A1* | 3/2022 | Volkerink | H04W 4/029 |
| 2022/0104822 A1* | 4/2022 | Shelton, IV | A61B 17/1155 |
| 2022/0131852 A1* | 4/2022 | Sharma | H04L 63/0815 |
| 2022/0165146 A1* | 5/2022 | Daoura | H04W 8/005 |
| 2022/0188172 A1* | 6/2022 | Gupta | G06F 9/5044 |
| 2022/0197620 A1* | 6/2022 | Vihar | G06F 8/65 |
| 2022/0198043 A1* | 6/2022 | Kozlowski | G06F 21/6218 |
| 2022/0200806 A1* | 6/2022 | Grobelny | H04L 9/0643 |
| 2022/0200972 A1* | 6/2022 | Potlapally | H04L 63/0435 |
| 2022/0200989 A1* | 6/2022 | Andrews | H04L 63/166 |
| 2022/0210518 A1* | 6/2022 | Smith | H04N 21/4854 |
| 2022/0261260 A1* | 8/2022 | Momchilov | G06F 9/452 |
| 2022/0283805 A1* | 9/2022 | Dasa | G06F 8/36 |
| 2022/0291946 A1* | 9/2022 | Taylor | G06F 21/51 |
| 2022/0294766 A1* | 9/2022 | Agarwal | H04L 63/306 |
| 2022/0303271 A1* | 9/2022 | Elsherif | G06F 8/61 |
| 2022/0308650 A1* | 9/2022 | Krishnakumar | G06F 1/3259 |
| 2022/0309041 A1* | 9/2022 | Whitechapel | G06F 8/61 |
| 2022/0312319 A1* | 9/2022 | Krishnakumar | H04W 52/0245 |
| 2022/0312328 A1* | 9/2022 | Krishnakumar | H04W 76/14 |
| 2022/0312329 A1* | 9/2022 | Krishnakumar | G06F 3/038 |
| 2022/0326929 A1* | 10/2022 | Sharma | G06F 9/44505 |
| 2022/0326939 A1* | 10/2022 | Chen | G06F 9/44536 |
| 2022/0326941 A1* | 10/2022 | Nelson | H04L 63/0471 |
| 2022/0334725 A1* | 10/2022 | Mertes | G06F 16/275 |
| 2022/0334929 A1* | 10/2022 | Potyraj | G06F 3/067 |
| 2022/0342899 A1* | 10/2022 | Harwood | G06F 9/505 |
| 2022/0358455 A1* | 11/2022 | Wappler | G06Q 10/0833 |
| 2022/0365821 A1* | 11/2022 | Darji | G06F 21/64 |
| 2022/0373983 A1* | 11/2022 | Gupta | H04L 67/12 |
| 2022/0376946 A1* | 11/2022 | Gupta | H04L 67/12 |
| 2022/0377132 A1* | 11/2022 | Gupta | F24F 11/56 |
| 2022/0391124 A1* | 12/2022 | Darji | G06F 3/0679 |
| 2022/0406452 A1* | 12/2022 | Shelton, IV | H03K 17/955 |

(56) References Cited

U.S. PATENT DOCUMENTS

| | | | | |
|---|---|---|---|---|
| 2022/0407907 | A1* | 12/2022 | Cheng | G06F 9/5077 |
| 2022/0414676 | A1* | 12/2022 | Power | H04L 63/18 |
| 2023/0019729 | A1* | 1/2023 | Karp | G06Q 30/0185 |
| 2023/0023597 | A1* | 1/2023 | Shrestha | G06F 8/65 |
| 2023/0025735 | A1* | 1/2023 | Acharya | H04L 67/34 |
| 2023/0026540 | A1* | 1/2023 | Shrestha | H04L 43/14 |
| 2023/0027485 | A1* | 1/2023 | Dasa | G06F 9/547 |
| 2023/0041806 | A1* | 2/2023 | Singh | H04L 63/0428 |
| 2023/0076669 | A1* | 3/2023 | Acharya | H04W 4/44 |
| 2023/0098227 | A1* | 3/2023 | Nadeau | G06F 16/2379 |
| | | | | 707/602 |
| 2023/0146947 | A1* | 5/2023 | Shelton, IV | A61B 17/0206 |
| | | | | 606/144 |
| 2023/0147759 | A1* | 5/2023 | Steinbrücker | G06V 20/20 |
| | | | | 345/419 |
| 2023/0165642 | A1* | 6/2023 | Shelton, IV | A61B 34/25 |
| | | | | 128/897 |
| 2023/0205510 | A1* | 6/2023 | Ramalingam | G06F 8/71 |
| | | | | 717/168 |
| 2023/0229417 | A1* | 7/2023 | Qian | G06F 8/65 |
| | | | | 717/170 |
| 2023/0315423 | A1* | 10/2023 | Scheckelhoff | H04L 12/2818 |
| | | | | 717/168 |
| 2023/0327882 | A1* | 10/2023 | Jayaraman | H04L 9/3247 |
| | | | | 713/153 |
| 2023/0336411 | A1* | 10/2023 | Metkar | H04L 41/0806 |
| | | | | 709/222 |

OTHER PUBLICATIONS

Zhang et al."Cloud Storage Oriented Secure Information Gateway," 2012 International Conference on Cloud Computing and Service Computing, IEEE Computer Society, pp. 119-123 (Year: 2019).*

Chen et al."Multi-Version Execution for the Dynamic Updating of Cloud Applications," 2015 IEEE 39th Annual International Computers, Software & Applications Conference, IEEE Computer Society, pp. 185-190.*

Chen et al "Multi-Version Execution for the Dynamic Updating of Cloud Applications," 2015 IEEE 39th Annual International Computers, Software and Applications Conference, IEEE Computer Society, pp. 185-190 (Year: 2015).*

Kolluru et al "Cloud Integration-Strategy to Connect Applications to Cloud," 2013 Annual IEEE India Conference (INDICON), pp. 1-6 (Year: 2013).*

Schwarzkopf et al "Checking Running and Dormant Virtual Machines for the Necessity of Security Updates in Cloud Environments," 2011 Third IEEE International Conference on Cloud Computing Technology and Science, IEEE Computer Society, pp. 239-246 ( Year: 2011).*

Oliveira et al."Delivering Software With Agility and Quality in a Cloud Environment," IBM J. Res & Dev, vol. 60 No 2/3, Paper 10, pp. 1-11 (Year: 2016).*

Balalaie et al."Microservices Architecture Enables DevOps," IEEE Softwaer, pp. 42-52, (Year: 2016).*

* cited by examiner

FIG. 3

```
{
  "manifestVersion": 0.1,
  "manifestGuid": "548320945h2jkxx",
  "manifestTimestamp": "2020-07-03T22:02:56.525+06:00",
  "manifestDelivery": "MFT",
  "currentSystemVersion": "3.7.8",
  "packageList": [
    {
      "packageId": 143693,
      "userFriendlyName": "Dell OS 3.8.0",
      "releaseVersion": "dOS v03.08.00.234.a",
      "releaseDate": "2019-12-10",
      "packageType": "OS",
      "packageDescription": "This release adds new features to the product",
      "releaseNotesLink": "http://kb.example.com/kb784395743xx",
      "criticality": "RECOMMENDED",
      "downloadMethod": "MFT",
      "stageDownload": "False",
      "serviceClassification": null,
      "justification": null,
      "fileList": [
        {
          "filename":"uni_x.x.ova",
          "fileVersion": "3.05.00.xxx.a",
          "customerVisibleVersion": "3.05.00.xxx",
          "fileType": "OS",
          "fileSizeKb": 473895,
          "fileChecksum": "bbd07c4fc02c99b97124febf42c7b63b5011c0df28d409fbb486b5a9d2e6xxxx"
          "filePath": "/HU55829203754/CUP/143xxx/"
        }
      ]
    },
    ...
  ]
}
```

US 11,853,100 B2

AUTOMATED DELIVERY OF CLOUD NATIVE APPLICATION UPDATES USING ONE OR MORE USER-CONNECTION GATEWAYS

FIELD

The field relates generally to information processing systems, and more particularly to techniques for providing security in such systems.

BACKGROUND

With a rise in cloud native application development, conventional application management systems face challenges in securely distributing application packages to customers or other users. For example, such conventional systems encounter distinct challenges with respect to on-premise user environments, which commonly do not prefer and/or trust connections to a public registry. In such instances, conventional application management systems are required to undertake error-prone and resource-intensive procedures to provide updates to on-premise application deployments.

SUMMARY

Illustrative embodiments of the disclosure provide techniques for automated delivery of cloud native application updates using one or more user-connection gateways. An exemplary computer-implemented method includes generating at least one application update package pertaining to at least one cloud native application, and generating at least one manifest file comprising identifying information for the at least one application update package and metadata pertaining to implementing at least a portion of the at least one application update package. The method also includes outputting, to at least one user device via one or more user-connection gateways, a request for automated remote action on at least one application within a user environment associated with the at least one user device, wherein the remote action relates to the at least one application update package. Further, the method includes processing, via the one or more user-connection gateways, a response from the at least one user device approving the request for automated remote action, outputting the at least one manifest file to the user environment associated with the at least one user device, and initiating, in accordance with the at least one manifest file, automated implementation of the at least one application update package to the at least one application within the user environment.

Illustrative embodiments can provide significant advantages relative to conventional application management systems. For example, problems associated with error-prone and resource-intensive procedures to provide updates to application deployments on user environments are overcome in one or more embodiments through secure automated delivery of cloud native application updates using one or more user-connection gateways.

These and other illustrative embodiments described herein include, without limitation, methods, apparatus, systems, and computer program products comprising processor-readable storage media.

BRIEF DESCRIPTION OF THE DRAWINGS

FIG. 3 shows an example code snippet for a common update platform manifest file in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
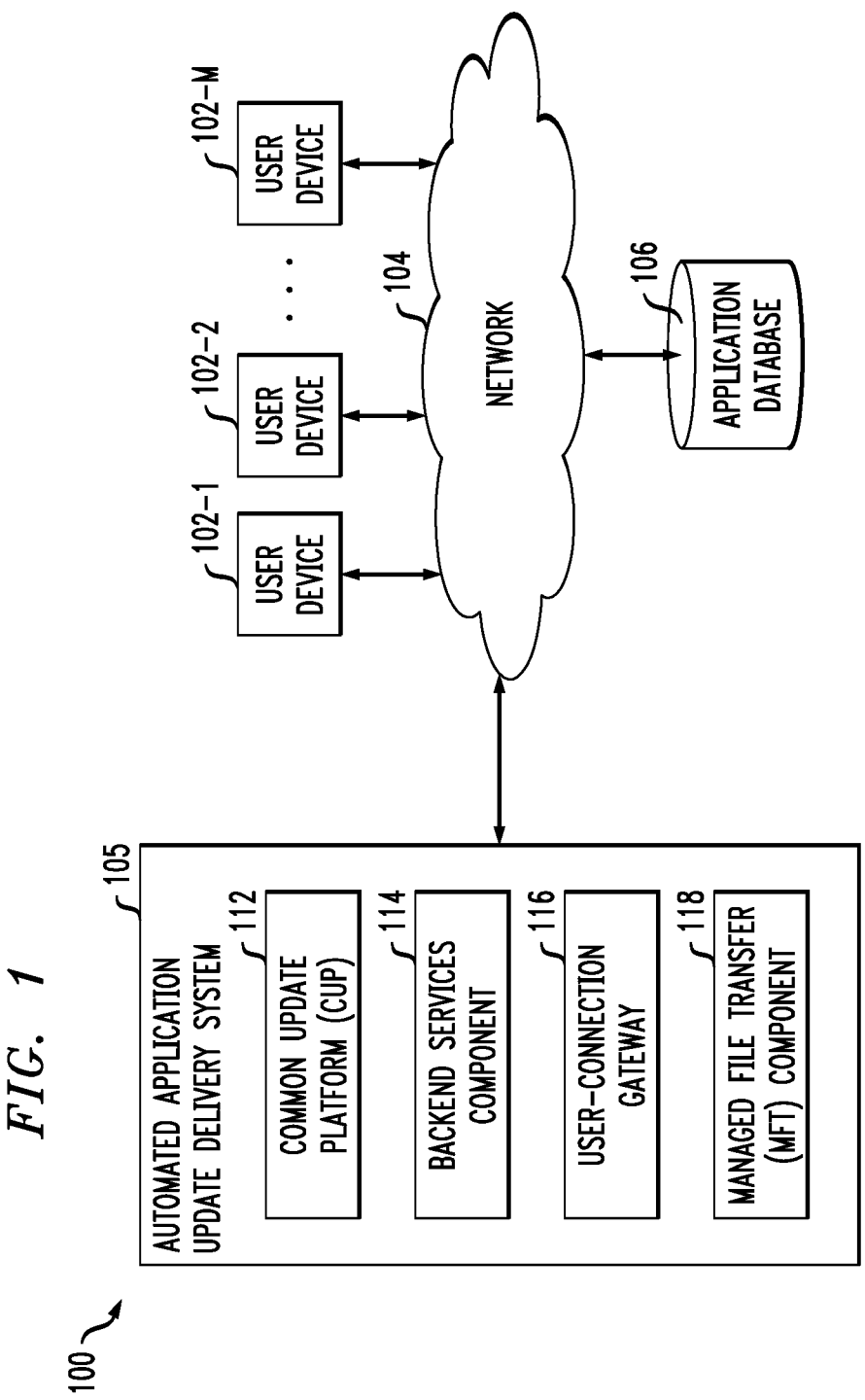
FIG. 1 shows an information processing system configured for automated delivery of cloud native application updates using one or more user-connection gateways in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is automated application update delivery system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, automated application update delivery system 105 can have an associated application database 106 configured to store data pertaining to cloud native applications, which comprise, for example, versioning and/or update information, as well as application identification information such as software unique identifiers (SWIDs), service tags, serial numbers, install base (IB) information, etc.

The application database 106 in the present embodiment is implemented using one or more storage systems associated with automated application update delivery system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with automated application update delivery system 105 are one or more input-output devices, which illustratively comprise keyboards, displays or other types of input-output devices in any combination. Such input-output devices can be used, for example, to support one or more user interfaces to automated application update delivery system 105, as well as to support communication between automated application update delivery system 105 and other related systems and devices not explicitly shown.

Additionally, automated application update delivery system 105 in the FIG. 1 embodiment is assumed to be implemented using at least one processing device. Each such processing device generally comprises at least one processor and an associated memory, and implements one or more functional modules for controlling certain features of automated application update delivery system 105.

More particularly, automated application update delivery system 105 in this embodiment can comprise a processor coupled to a memory and a network interface.

As also detailed herein, in one or more embodiments, automated application update delivery system can be implemented in connection with and/or resident on an enterprise backend and/or an application development backend (e.g., at least one server linked with applications and one or more databases, etc.).

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows automated application update delivery system 105 to communicate over the network 104 with the user devices 102, and illustratively comprises one or more conventional transceivers.

The automated application update delivery system 105 further comprises a common update platform (CUP) 112, a backend services component 114, a user-connection gateway 116, and a managed file transfer (MFT) component 118.

It is to be appreciated that this particular arrangement of elements 112, 114, 116 and 118 illustrated in automated application update delivery system 105 of the FIG. 1 embodiment is presented by way of example only, and alternative arrangements can be used in other embodiments. For example, the functionality associated with elements 112, 114, 116 and 118 in other embodiments can be combined into a single module, or separated across a larger number of modules. As another example, multiple distinct processors can be used to implement different ones of elements 112, 114, 116 and 118 or portions thereof.

At least portions of elements 112, 114, 116 and 118 may be implemented at least in part in the form of software that is stored in memory and executed by a processor.

It is to be understood that the particular set of elements shown in FIG. 1 for automated delivery of cloud native application updates involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, automated application update delivery system 105 and application database 106 can be on and/or part of the same processing platform.

An exemplary process utilizing elements 112, 114, 116 and 118 of an example automated application update delivery system 105 in computer network 100 will be described in more detail with reference to the flow diagram of FIG. 7.

Accordingly, at least one embodiment includes automated delivery of cloud native application updates, for example, to on-premise users and/or application deployments, using one or more user-connection gateways. For example, user-connection gateways can include virtual multi-way connections between customers or other users and enterprises and/or application developers. Such a user-connection gateway can be installed by and/or for a user on-premise to establish connectivity of the on-premise user environment with an enterprise backend. In an example embodiment, each application deployed from the backend to an on-premise user environment would include a user-connection gateway, which can be configured to have a direct connection with the backend and/or proxied through one or more additional gateways.

As used herein, an "on-premise" user environment can include, for example, a customer or other user data center which includes one or more computing devices (e.g., servers, switches, power distribution units (PDUs), etc.), an isolated location which provides physical security of the user environment and network security of the computing environment, etc.

One or more embodiments includes utilizing such a secure conduit between an on-premise user environment and an enterprise backend enables multiple capabilities to be automated between the two (or more) entities. For example, the enterprise can obtain and/or collect telemetry data and configuration information from the on-premise user environment, e.g., to identify relevant patches and updates, as well as trends and/or best practices. Additionally, in one or more embodiments, the enterprise can also, for example, initiate automated issue detection and proactive case creation, implement self-service case initiation and management, enable remote technical support, and provide to the user automated access to software and/or application updates. Specifically, at least one embodiment includes generating a software update mechanism using such a user-connection gateway, wherein the software update mechanism includes cloud native application updates delivered automatically and/or continuously to on-premise user environments.

By way merely of illustration, architecture related to one or more user-connection gateways can include an MFT component (also referred to herein as a locker) used by an on-premise user environment to push binary files such as log bundles to attach to a critical event which will result in an automatic service request ticket creation, for example, via a case lifecycle management (CLM) service. The same MFT locker can also be used for pushing a software update from an enterprise backend to an on-premise user environment via a user-connection gateway conduit. Once data is received on such an enterprise backend, at least a portion of the data can be routed to a specific service based on the user-connection gateway protocol.

Additionally or alternatively, at least one embodiment can include implementing a different deployment topology wherein the user elects to have a single interface with the enterprise backend via a user-connection gateway and apply one or more policies offered by the user-connection gateway for data exchange.

In one or more embodiments, each application in a given backend can be identified by a set of unique attributes such as, for example, a SWID, a service tag, a serial number, an IB, etc. Such a backend can be designed, e.g., for multi-tenancy based at least in part on such identifying attributes. Also, in such an embodiment, each customer or other user can be provided a unique access key and one or more credentials to establish connectivity with at least one backend via one or more user-connection gateways.

As further detailed herein, at least one embodiment includes augmenting user-connection infrastructure with respect to a backend to include hosting a container registry (such as, e.g., Harbor registry) and adding pull and push gateways to proxy Docker commands for pulling and pushing container images to the registry. Such an embodiment also includes generating and/or adding a CUP to allow software and/or product teams to define and manage applications. The CUP provides a web portal for software teams to create, update, and/or delete versioned application updates. An application in CUP can be comprised of a manifest file and a binary package.

In one or more embodiments, a CUP manifest file contains a list of packages available for download along with the metadata for each package (e.g., in a JavaScript object notation (JSON) format), such as depicted, for example, in FIG. 3. Such a package is defined as the software package that is displayed to the user as available for download. The metadata provide relevant information to the customer or other user prior to downloading the full package. By way of example, a package can be associated with a single file for download and/or associated with multiple files to be downloaded together. In at least one embodiment, the CUP manifest file is unique to each product and is assigned based at least in part on the product's serial number, which could be a SWID or other means of identifying information.

A CUP manifest file can be updated by a corresponding CUP, for example, anytime anything changes for an assigned package such as when a system updates to a newer version of the product, when a package is assigned to a system through a rollout, when a package is assigned to a system from an external portal, when the metadata change for a package that has already been assigned to a given system, when a package is disabled that is assigned to a given system, etc.

Figure 2:
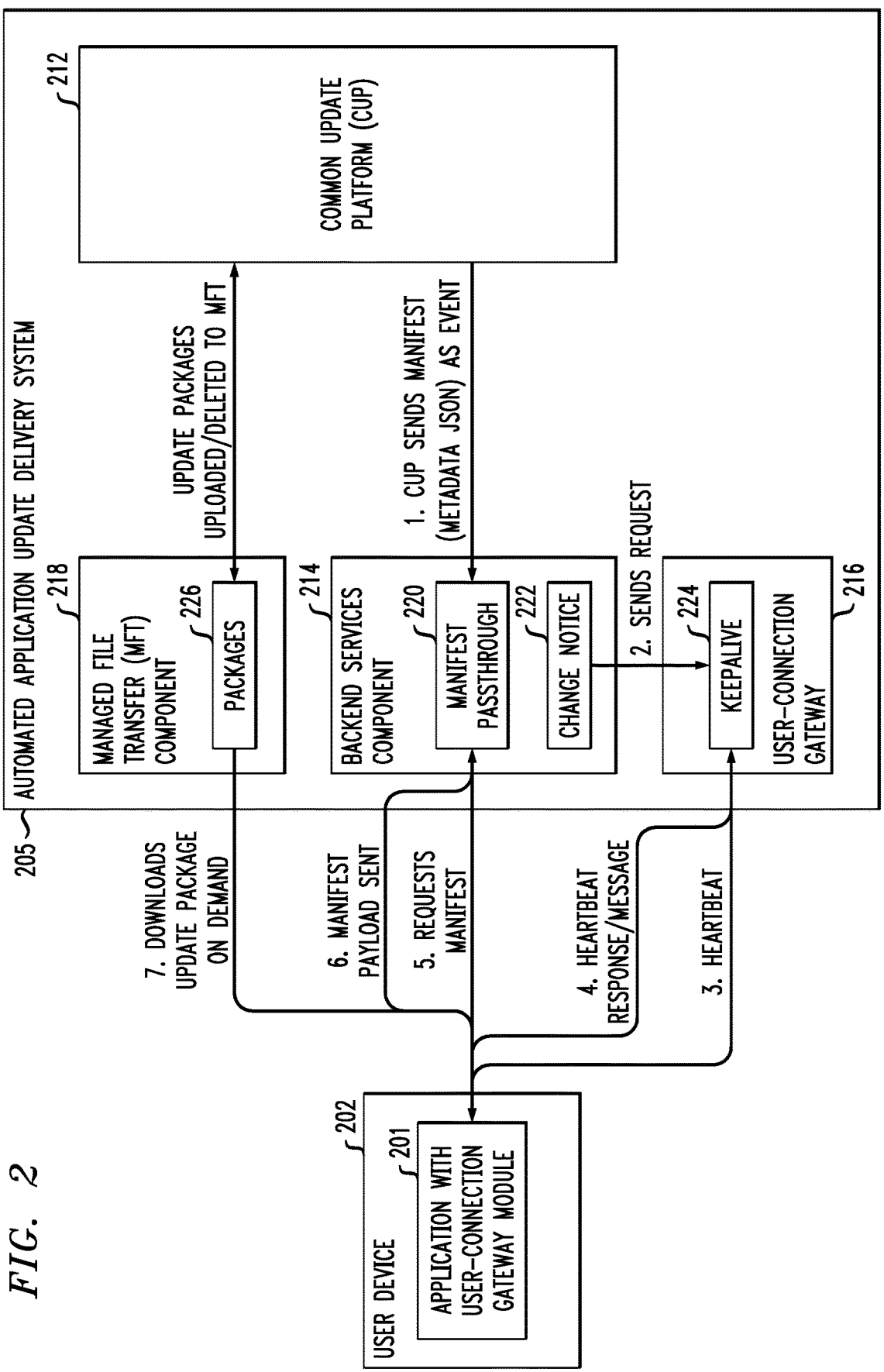
FIG. 2 shows architecture for a common update platform in an illustrative embodiment.

FIG. 2 shows architecture for a common update platform in an illustrative embodiment. By way of illustration, FIG. 2 depicts an application 201 with a user-connection gateway module within and/or resident on user device 202. FIG. 2 also depicts automated application update delivery system 205, which includes CUP 212, backend services component 214, user-connection gateway 216, and MFT component 218. Additionally, an example workflow carried out among these noted components is illustrated in FIG. 2. Specifically, CUP 212 updates one or more packages 226 within MFT component 218 (e.g., uploads a new application update/version to MFT component 218 and/or deletes a previous update/version from MFT component 218) and also sends a manifest file 220 (including metadata JSON) as an event to backend services component 214. More specifically, in one or more embodiments, the manifest is being sent as a message through secure remote services. The backend services component 214 then sends a change notice 222 in connection with a request for remote action on user device 202 to user-connection gateway 216. In one or more embodiments, the change notice 222 indicates that there is a new manifest to retrieve. Also, the request can be sent in the form of a keepalive message 224 (i.e., a message sent between devices (such as, e.g., system 205 and user device 202) to determine that a connection between the devices is functional).

As also illustrated in FIG. 2, user device 202 (via application 201) sends a heartbeat message (i.e., a message indicating that the communication link between user device 202 and system 205 is functioning properly) to user-connection gateway 216, which then responds to the heartbeat message with additional data indicating that the product has a new manifest. User device 202 (via application 201) then requests the manifest 220 from backend services component 214, and the manifest 220 payload is sent by backend services component 214 to application 201. Subsequently, application 201 downloads the update package 226 on demand from MFT component 218.

FIG. 3 shows an example code snippet for a common update platform manifest file in an illustrative embodiment. In this embodiment, example code snippet 300 is executed by or under the control of at least one processing system and/or device. For example, the example code snippet 300 may be viewed as comprising a portion of a software implementation of at least part of automated application update delivery system 105 of the FIG. 1 embodiment.

The example code snippet 300 illustrates metadata that can be displayed in an update notification to the customer or other user to provide details of at least one available update.

Additionally, such outputs can be generated and/or displayed without the customer or other user having to download the actual update package(s).

It is to be appreciated that this particular example code snippet shows just one example implementation of a portion of a common update platform manifest file, and alternative implementations of the process can be used in other embodiments.

In one or more embodiments, a CUP and user-connection gateway integration allows automated and/or continuous delivery of application updates from at least one backend to at least one on-premise user environment (e.g., a product downloaded on a user device on-premise). A user-connection gateway module running within the product can obtain and/or receive a new CUP manifest file as part of a keepalive response and informs the product that a new version of the application is available for download. The user-connection gateway can begin downloading packages in the background to stage the update(s). Additionally, the product notifies the customer or other user via a user interface (UI) that an update is available, and when the customer or other user selects the upgrade (e.g., clicks on a prompt) in the UI, the product initiates a rolling upgrade of the application. At the end of the process, the product notifies the customer or other user via the UI that the upgrade was completed or failed. Also, as used herein, a product can refer to an application.

Figure 4:
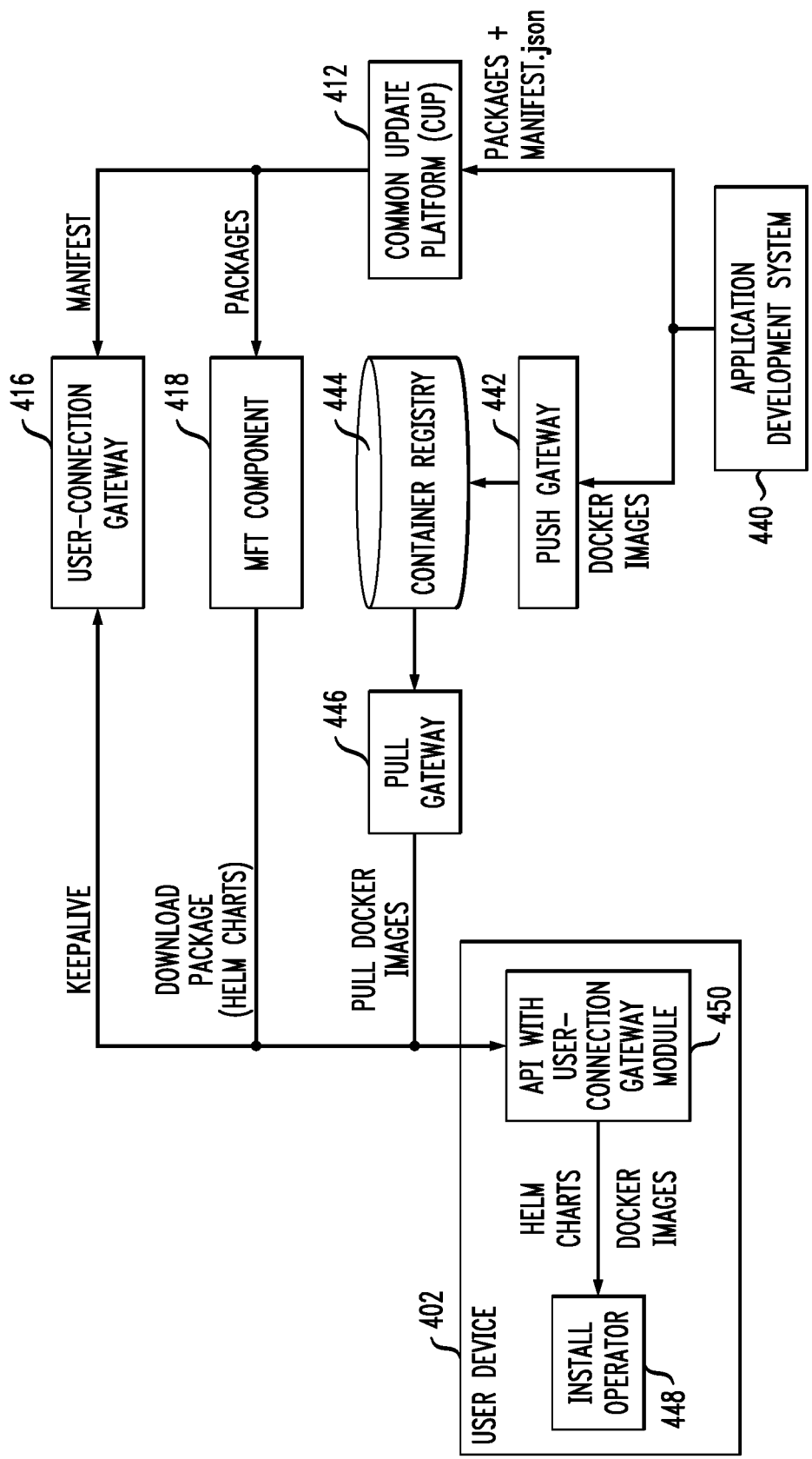
FIG. 4 shows an example workflow in an illustrative embodiment.

FIG. 4 shows an example workflow in an illustrative embodiment. By way of illustration, FIG. 4 depicts an example workflow for a use case involving a user opting-in to a direct support assistance offering from an enterprise. As detailed herein, one or more embodiments including leveraging a CUP for automated and/or continuous delivery of cloud native applications and/or application updates. A cloud native application is typically comprised of manifest files and/or helm charts and one or more container images. Also, in at least one embodiment, the CUP package for a cloud native application can include a tar archive of manifest files (i.e., a collection of manifest files) and/or one or more Helm charts (i.e., Kubernetes YAML (or some other human-readable data-serialization language) manifests combined into a single package). The CUP manifest file can represent, in such an embodiment, relevant application metadata for the purpose of support assistance integration.

Referring again to FIG. 4, an application development system 440 (e.g., a product team and/or an integrated continuous integration/continuous deployment (CI/CD) environment) can push a cloud native application package (e.g. one or more Helm charts) along with a CUP manifest file via CUP 412 to produce a new version of and/or update to a given application. In one or more embodiments, the application package (e.g., YAML manifest and/or charts) refers to a set of container images (e.g., open container initiative (OCI) images) which the application development system 440 can push separately to a container registry 444 via an internal push gateway 442 (e.g., a nginx web server). In at least one embodiment, push gateway 442 is a Docker proxy implementing Docker push commands to allow application development system 440 to publish a container image to container registry 444. Similarly, in such an embodiment, pull gateway 446 is a Docker proxy implementing Docker pull commands to allow application programming interface (API) 450 to download a container image from container registry 444.

As also depicted in FIG. 4, user-connection gateway 416 (which can, for example, be implemented in conjunction and/or in combination with a backend services component, and which can also be referred to as a service gateway) can obtain and/or receive a new CUP manifest file from CUP 412 in connection with a keepalive communication (from user device 402). User-connection gateway 416 can also communicate with application development system 440 regarding available updates to one or more applications. Additionally or alternatively, in an example embodiment such as depicted in FIG. 4, a user-connection gateway module can be embedded within API 450.

With respect to user device 402 (which can include, for example, a Kubernetes platform), an install operator 448 (running, e.g., as part of a given application), obtains a notification from user-connection gateway 416 of a new package and downloads the package via API 450 from MFT component 418. The install operator 448 deploys the package using one or more package native commands. For example, if the package is a Helm chart, then the install operator 448 can implement a command such as "$ helm install -f myvalues.yaml mypackage./package." If, for example, the package is a YAML file for a Docker Swarm, the install operator 448 can run a Docker command to deploy the application. Additionally, the install operator 448 can configure a container orchestration engine to add the user-connection gateway 416 as the local container registry. In such an embodiment, the user-connection gateway 416 is modified to proxy Docker pull commands, via pull gateway 446, to container registry 444 hosted, for example, by an enterprise and/or application development backend. As a result, the package of native install commands (e.g., Helm install) works efficiently to deploy containers because the package has access to the container registry via user-connection gateway 416. Also, if enough storage is available, user-connection gateway 416 can be configured to cache container images locally to avoid downloading all dependencies for every incremental update of the given application.

Figure 5:
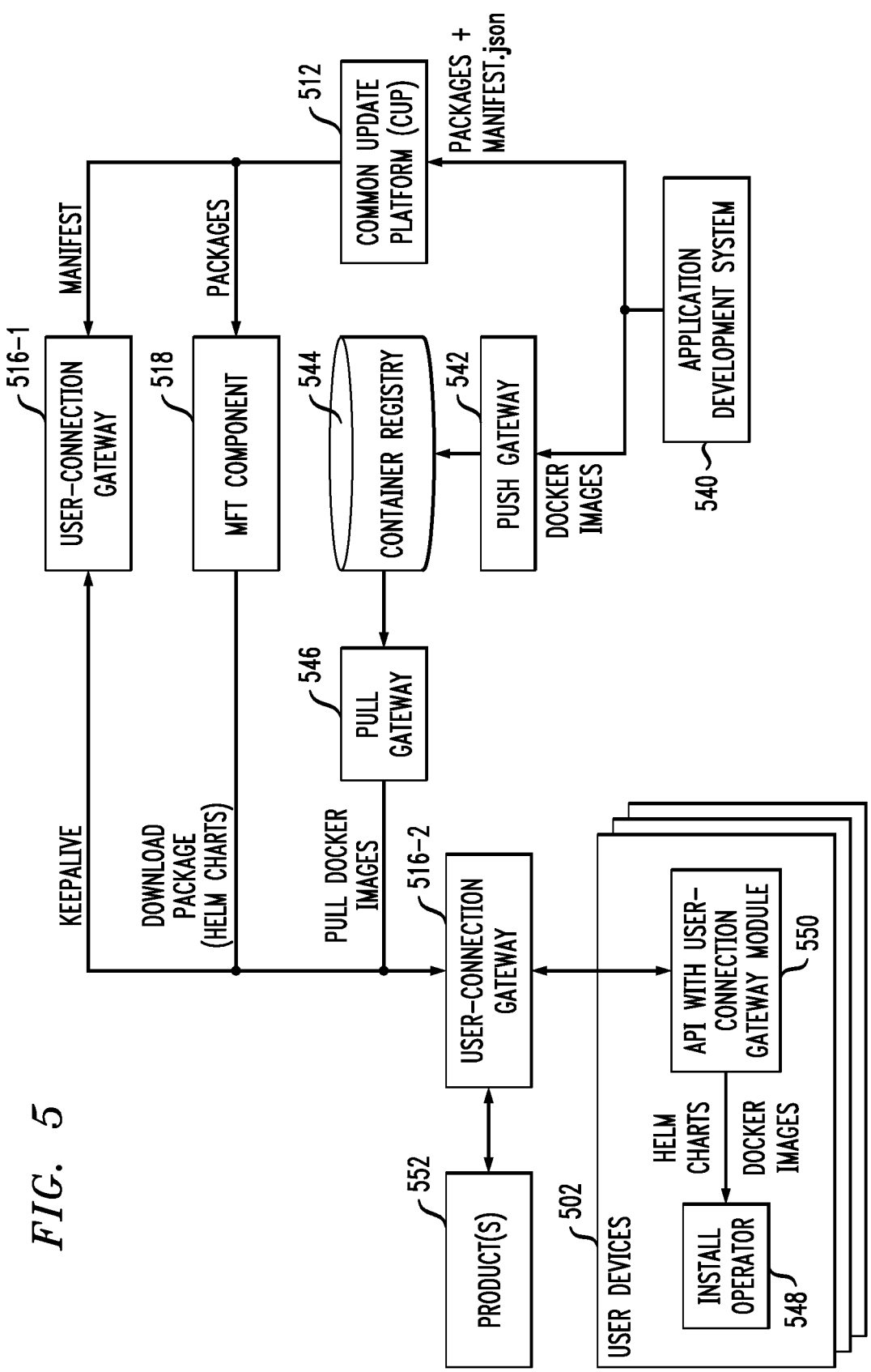
FIG. 5 shows an example workflow in an illustrative embodiment.

FIG. 5 shows an example workflow in an illustrative embodiment. By way of illustration, FIG. 5 depicts an example workflow for a use case involving an enterprise user opting-in to a support assistance offering from an enterprise. For example, in connection with the embodiment illustrated in FIG. 5, an enterprise customer or other user may have multiple enterprise products running in their on-premise environment. In such contexts, at least one embodiment can include leveraging an additional user-connection gateway 516-2 to aggregate enterprise backend communications from multiple products (including, e.g., product(s) 552).

It is noted and to be appreciated that with the exception of product(s) 552 and user-connection gateway 516-2, the elements (i.e., application development system 540, push gateway 542, container registry 544, pull gateway 546, CUP 512, MFT component 518, user-connection gateway 516-1, user device 502, install operator 548, and API 550) depicted in FIG. 5 and their role(s) and/or functionality in the techniques illustrated therein are the same as those depicted in FIG. 4.

That said, the example embodiment depicted in FIG. 5 differs from the example embodiment depicted in FIG. 4 in that user-connection gateway 516-1 is configured to proxy Docker pull commands via user-connection gateway 516-2, wherein the user-connection gateway 516-2 is a virtual appliance (e.g., a virtual machine (VM)) modified to cache container images locally to expedite the Docker pull of the same image(s) by multiple products (including, e.g., product(s) 552).

Figure 6:
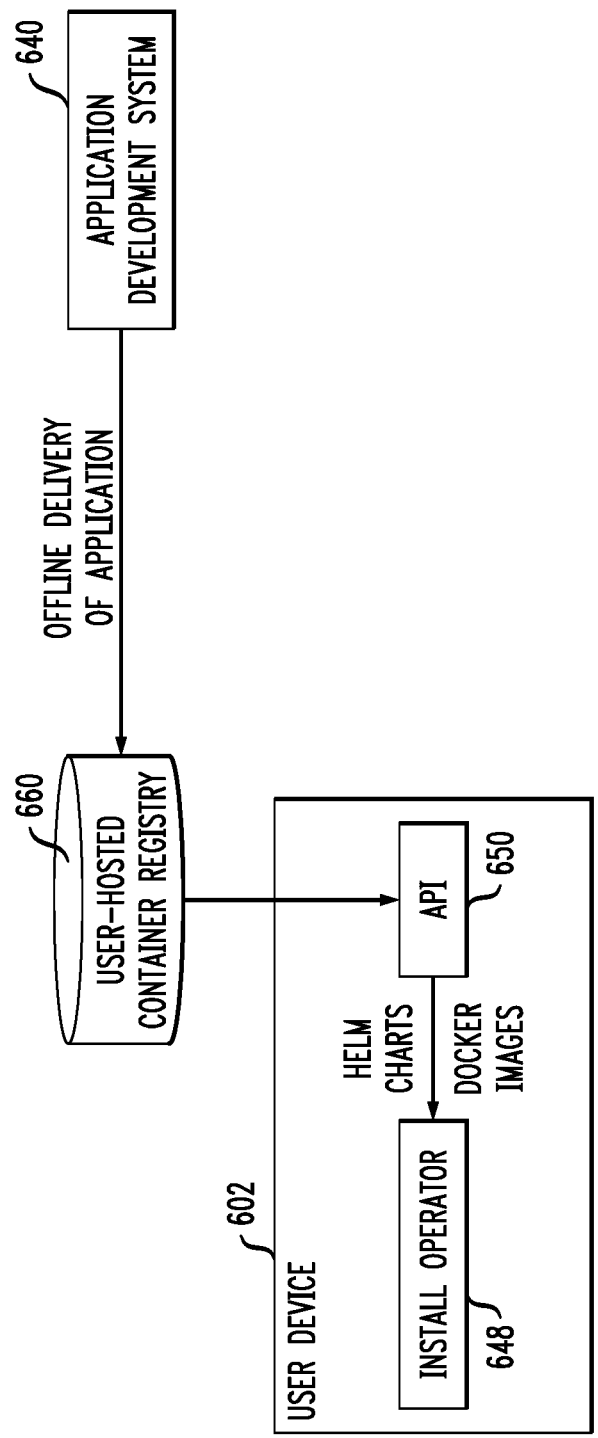
FIG. 6 shows an example workflow in an illustrative embodiment.

FIG. 6 shows an example workflow in an illustrative embodiment. By way of illustration, FIG. 6 depicts an example workflow for a use case involving a user opting out of a direct support assistance offering from an enterprise. As shown in FIG. 6, if a customer or other user chooses not to connect with an enterprise backend and opts-out of support assistance integration, API 650 can be configured to point application development system 640 to perform offline delivery of an application and/or update thereof to a local storage containing docker images and/or to a local container registry 660 hosted by the customer or other user. With respect to the install operator 648 of user device 602, the interface with API 650 is similar to the embodiments described above in connection with FIG. 4 and FIG. 5.

It is also to be appreciated that the elements depicted, for example, in FIG. 4, FIG. 5, and FIG. 6 can be modified in one or more embodiments. For instance, in one such embodiment, a user-connection gateway module can be embedded in an API (e.g., element 450 in FIG. 4) which has a direct connection to a user-connection gateway and/or services gateway (e.g., element 416 in FIG. 4). Additionally or alternatively, another such embodiment can include using a dedicated user-connection gateway (e.g., element 516-2 in FIG. 5) in addition to an API with an embedded user-connection gateway module (e.g., element 550 in FIG. 5). In such a configuration, API 550 does not have direct connection with user-connection gateway 516-1, but does have a connection via user-connection gateway 516-2. Such a configuration is required, for example, when multiples of user device 502 are present, and the customer or other user does not want each device to have direct connection with user-connection gateway 516-1. In such an embodiment, user-connection gateway 516-2 can provide caching and policy features that a customer or other user can leverage to manage multiples of user device 502. Additionally or alternatively, yet another such embodiment can include enabling a customer or other user to opt-out of a user-Connection gateway for an air-gapped environment. As illustrated, for example, in FIG. 6, in such an embodiment, API 650 is configured to connect to a customer or other user-hosted registry 660. In any of the above-noted configurations, the install operator (e.g., elements 448, 548, and 648 in FIG. 4, FIG. 5, and FIG. 6, respectively) maintains a consistent interface with the API (e.g., elements 450, 550, and 650 in FIG. 4, FIG. 5, and FIG. 6, respectively).

Figure 7:
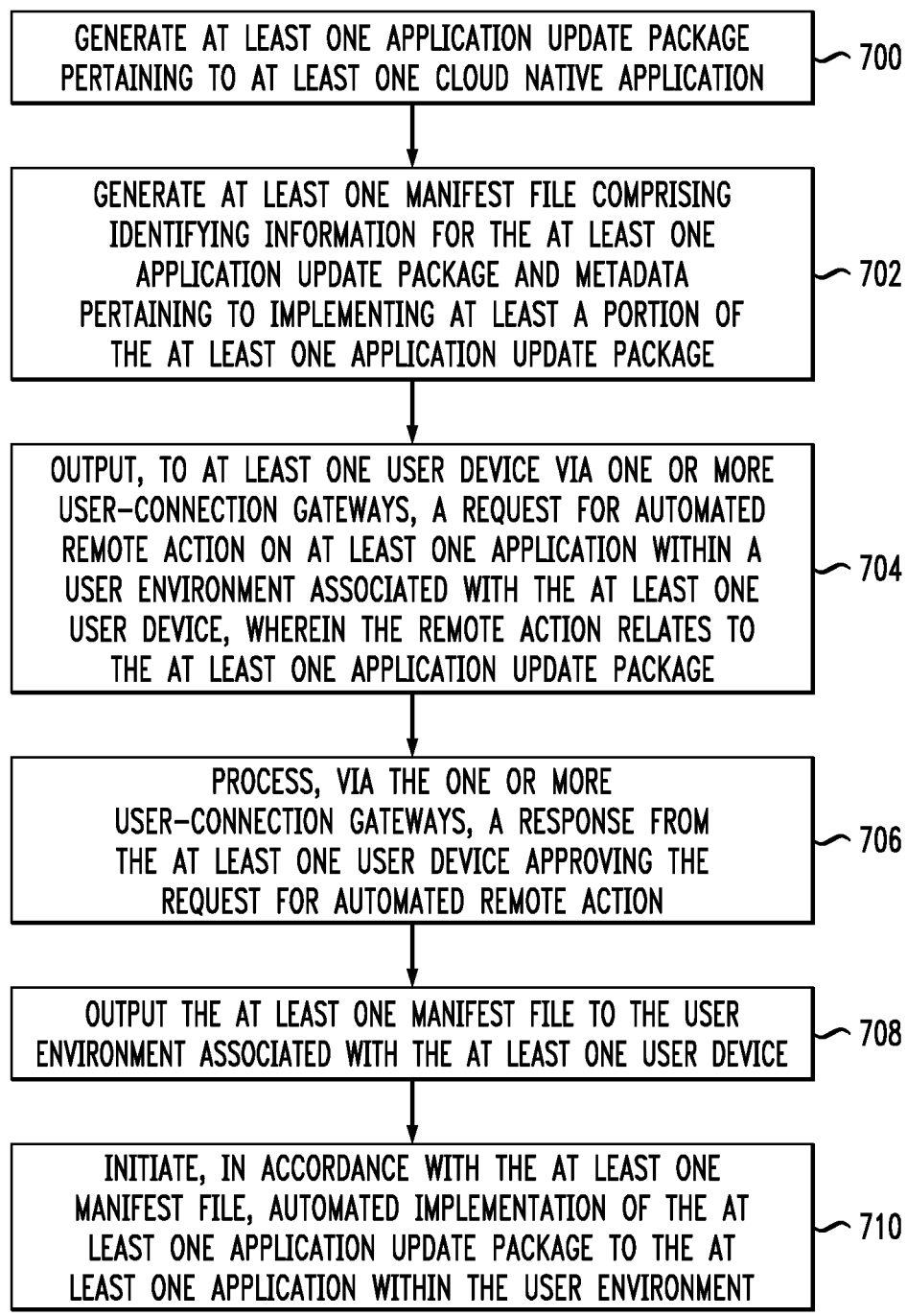
FIG. 7 is a flow diagram of a process for automated delivery of cloud native application updates using one or more user-connection gateways in an illustrative embodiment.

FIG. 7 is a flow diagram of a process for automated delivery of cloud native application updates using one or more user-connection gateways in an illustrative embodiment. It is to be understood that this particular process is only an example, and additional or alternative processes can be carried out in other embodiments.

In this embodiment, the process includes steps 700 through 710. These steps are assumed to be performed by the automated application update delivery system 105 utilizing its elements 112, 114, 116 and 118.

Step 700 includes generating at least one application update package pertaining to at least one cloud native application. In at least one embodiment, generating the at least one application update package includes validating each container image related to a cloud native application update by scanning each container image for one or more security vulnerabilities.

As used herein, in accordance with one or more embodiments, an application update package can include binaries of one or more microservices that need to be deployed in a given data center and/or cloud computing environment to provide services, for example, through a web UI or representational state transfer (REST) API to at least one end user. Additionally, an application update package can also include a Helm chart that describes the configuration parameters in a declarative format (e.g., YAML) for at least one specific environment (e.g., a given cloud computing environment). For example, such configuration parameters can include a uniform resource locator (URL) of Docker images to launch a microservice as one or more Docker containers, a persistent volume to be mapped to a given Docker container, one or more configuration files to be mounted inside a given Docker container, a version number and name of a given microservice, etc.

By way merely of example, an illustrative application update package can include a set of Docker images (e.g., OCI images) and one or more Helm charts. For instance, such an example application update package can include a Docker image for a nginx web server and a Helm chart, a Docker image for a database and a Helm chart, a Docker image for another Java, Python, and/or Go-based microservice and a Helm chart, etc.

Step 702 includes generating at least one manifest file comprising identifying information for the at least one application update package and metadata pertaining to implementing at least a portion of the at least one application update package. In one or more embodiments, the metadata associated with the at least one application update package include metadata in a JavaScript object notation format. Additionally or alternatively, the identifying information for the at least one application update package can include one or more of a software unique identifier for each of the at least one cloud native application, a service tag for each of the at least one cloud native application, a serial number for each of the at least one cloud native application, and install base information for each of the at least one cloud native application.

Also, as used herein, in accordance with one or more embodiments, a manifest file includes a file describing a release version of the given application. An example manifest file can include information such as an identifier of the application, the version of the application, the release date of the application, a knowledgebase URL, file size of the application, etc. Also, in at least one embodiment, an update notification presented to the user would include information such as noted above.

Step 704 includes outputting, to at least one user device via one or more user-connection gateways, a request for automated remote action on at least one application within a user environment associated with the at least one user device, wherein the remote action relates to the at least one application update package. In at least one embodiment, the request for remote action includes a keepalive message associated with determining that a connection with the at least one user device is functional. Also, in one or more embodiments, the one or more user-connection gateways include one or more virtual multi-way connections between at least one remote user device and at least one enterprise backend.

Step 706 includes processing, via the one or more user-connection gateways, a response from the at least one user device approving the request for automated remote action. Step 708 includes outputting the at least one manifest file to the user environment associated with the at least one user device. Step 710 includes initiating, in accordance with the at least one manifest file, automated implementation of the at least one application update package to the at least one application within the user environment. In at least one embodiment, initiating automated implementation of the at least one application update package includes initiating automated implementation of one or more of at least one artificial intelligence-machine learning model, at least one virtual application, and at least one container application.

The techniques depicted in FIG. 7 can also include obtaining, from the user environment, one or more of telemetry data and configuration information, as well as determining, for inclusion in the at least one application update package and based at least in part on the obtained telemetry data and/or obtained configuration information, at least one of one or more cloud native application patches and one or more cloud native application updates. Additionally or alternatively, one or more embodiments can include outputting, to the at least one user device, at least one unique access key and one or more credentials for use in establishing connectivity via the one or more user-connection gateways. Also, at least one embodiment can include caching one or more container images related to one or more cloud native application updates common across one or more applications implemented within the user environment.

Accordingly, the particular processing operations and other functionality described in conjunction with the flow diagram of FIG. 7 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to provide automated delivery of cloud native application updates using one or more user-connection gateways. These and other embodiments can effectively overcome problems associated with error-prone and resource-intensive procedures to provide updates to application deployments on user environments.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 8 and 9. Although described in the context of system 100, these platforms may also be used to implement at least portions of other information processing systems in other embodiments.

Figure 8:
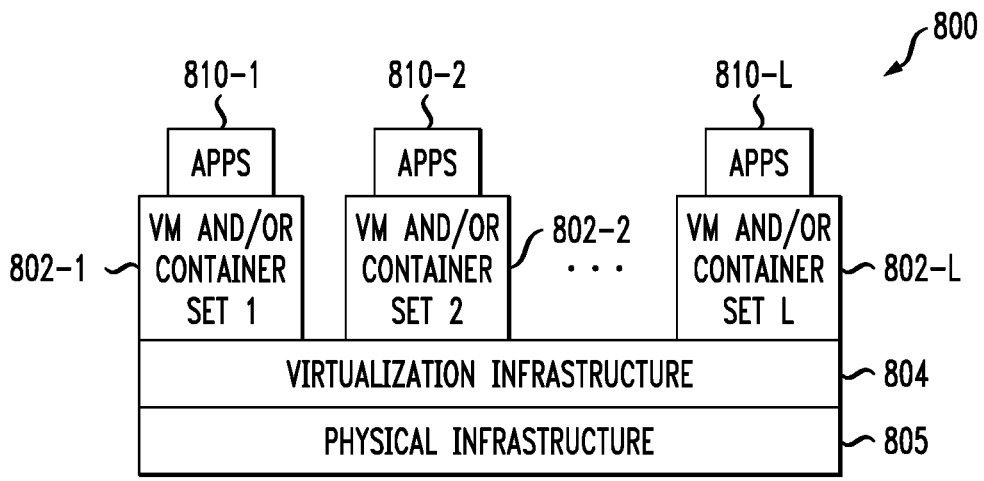
FIGS. 8 and 9 show examples of processing platforms that may be utilized to implement at least a portion of an information processing system in illustrative embodiments.
Figure 9:
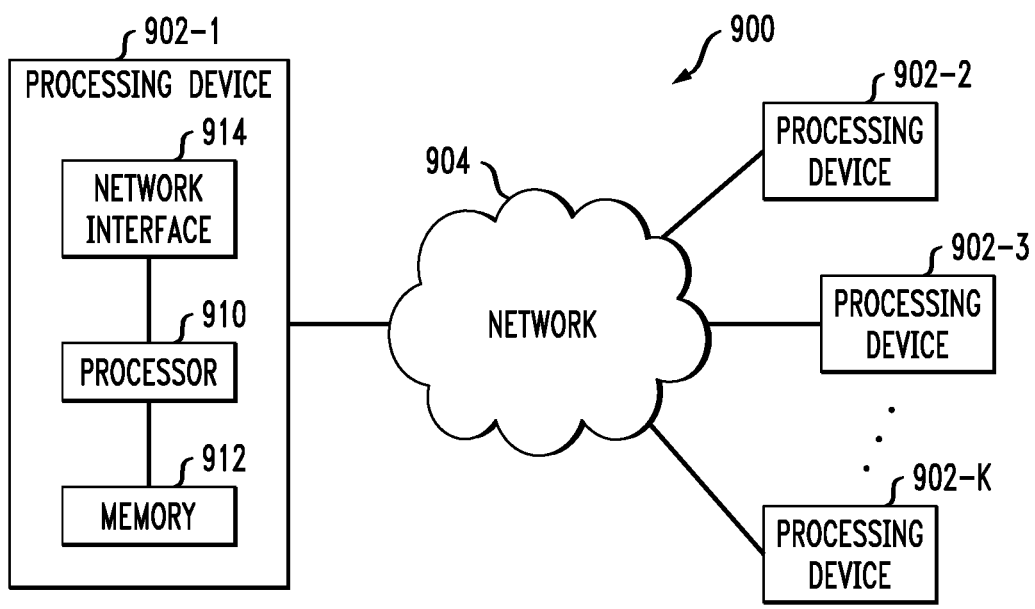

FIG. 8 shows an example processing platform comprising cloud infrastructure 800. The cloud infrastructure 800 comprises a combination of physical and virtual processing resources that are utilized to implement at least a portion of the information processing system 100. The cloud infrastructure 800 comprises multiple VMs and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 comprise respective VMs, respective sets of one or more containers, or respective sets of one or more containers running in VMs. In some implementations of the FIG. 8 embodiment, the VMs/container sets 802 comprise respective VMs implemented using virtualization infrastructure 804 that comprises at least one hypervisor.

A hypervisor platform may be used to implement a hypervisor within the virtualization infrastructure 804, wherein the hypervisor platform has an associated virtual infrastructure management system. The underlying physical machines comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of system 100 and includes a plurality of processing devices, denoted 902-1, 902-2, 902-3, ... 902-K, which communicate with one another over a network 904.

The network 904 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 902-1 in the processing platform 900 comprises a processor 910 coupled to a memory 912.

The processor 910 comprises a microprocessor, a microcontroller, an application-specific integrated circuit (ASIC), a field-programmable gate array (FPGA) or other type of processing circuitry, as well as portions or combinations of such circuitry elements.

The memory 912 comprises random access memory (RAM), read-only memory (ROM) or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
generating at least one application update package pertaining to at least one cloud native application;
generating at least one manifest file comprising identifying information for the at least one application update package and metadata pertaining to implementing at least a portion of the at least one application update package, wherein the identifying information comprises one or more of at least one software unique identifier for the at least one cloud native application, at least one service tag for the at least one cloud native application, at least one serial number for the at least one cloud native application, and install base information for the at least one cloud native application;

outputting, to at least one user device, at least one unique access key and one or more credentials for use in establishing connectivity via one or more user-connection gateways;

outputting, to the at least one user device via the one or more user-connection gateways, (i) a request for automated remote action on at least one version of the at least one cloud native application implemented within at least one on-premise user environment associated with the at least one user device, and (ii) a notice indicating that the at least one manifest file is available, wherein the remote action relates to the at least one application update package, and wherein the request comprises at least one message associated with determining that a connection with the at least one user device is functional;

processing, via the one or more user-connection gateways, a response from the at least one user device approving the request for automated remote action;

outputting, based at least in part on processing the response, the at least one manifest file to the at least one on-premise user environment associated with the at least one user device; and initiating, in accordance with the at least one manifest file, automated implementation of the at least one application update package to the at least one version of the at least one cloud native application implemented within the at least one on-premise user environment;

wherein the method is performed by at least one processing device comprising a processor coupled to a memory.

2. The computer-implemented method of claim 1, further comprising:
obtaining, from the at least one on-premise user environment, one or more of telemetry data and configuration information.

3. The computer-implemented method of claim 2, further comprising:
determining, for inclusion in the at least one application update package and based at least in part on the obtained telemetry data and/or obtained configuration information, at least one of one or more cloud native application patches and one or more cloud native application updates.

4. The computer-implemented method of claim 1, further comprising:
caching one or more container images related to one or more cloud native application updates common across one or more versions of the at least one cloud native application implemented within the at least one on-premise user environment.

5. The computer-implemented method of claim 4, wherein generating the at least one application update package comprises validating each container image related to a cloud native application update by scanning each container image for one or more security vulnerabilities.

6. The computer-implemented method of claim 1, wherein the metadata associated with the at least one application update package comprise metadata in a JavaScript object notation format.

7. The computer-implemented method of claim 1, wherein the one or more user-connection gateways comprise one or more virtual multi-way connections between at least one remote user device and at least one enterprise backend.

8. The computer-implemented method of claim 1, wherein initiating automated implementation of the at least one application update package comprises initiating automated implementation of one or more of at least one artificial intelligence-machine learning model, at least one virtual application, and at least one container application.

9. A non-transitory processor-readable storage medium having stored therein program code of one or more software programs, wherein the program code when executed by at least one processing device causes the at least one processing device:

to generate at least one application update package pertaining to at least one cloud native application;

to generate at least one manifest file comprising identifying information for the at least one application update package and metadata pertaining to implementing at least a portion of the at least one application update package, wherein the identifying information comprises one or more of at least one software unique identifier for the at least one cloud native application, at least one service tag for the at least one cloud native application, at least one serial number for the at least one cloud native application, and install base information for the at least one cloud native application;

to output, to at least one user device, at least one unique access key and one or more credentials for use in establishing connectivity via one or more user-connection gateways;

to output, to the at least one user device via the one or more user-connection gateways, (i) a request for automated remote action on at least one version of the at least one cloud native application implemented within at least one on-premise user environment associated with the at least one user device, and (ii) a notice indicating that the at least one manifest file is available, wherein the remote action relates to the at least one application update package, and wherein the request comprises at least one message associated with determining that a connection with the at least one user device is functional;

to process, via the one or more user-connection gateways, a response from the at least one user device approving the request for automated remote action;

to output, based at least in part on processing the response, the at least one manifest file to the at least one on-premise user environment associated with the at least one user device; and to initiate, in accordance with the at least one manifest file, automated implementation of the at least one application update package to the at least one version of the at least one cloud native application implemented within the at least one on-premise user environment.

10. The non-transitory processor-readable storage medium of claim 9, wherein the program code when executed by the at least one processing device further causes the at least one processing device:
to obtain, from the at least one on-premise user environment, one or more of telemetry data and configuration information.

11. The non-transitory processor-readable storage medium of claim 10, wherein the program code when executed by the at least one processing device further causes the at least one processing device:
to determine, for inclusion in the at least one application update package and based at least in part on the obtained telemetry data and/or obtained configuration information, at least one of one or more cloud native application patches and one or more cloud native application updates.

12. The non-transitory processor-readable storage medium of claim 9, wherein the program code when executed by the at least one processing device further causes the at least one processing device:

to cache one or more container images related to one or more cloud native application updates common across one or more versions of the at least one cloud native application implemented within the at least one on-premise user environment.

13. An apparatus comprising:

at least one processing device comprising a processor coupled to a memory;

the at least one processing device being configured:

to generate at least one application update package pertaining to at least one cloud native application;

to generate at least one manifest file comprising identifying information for the at least one application update package and metadata pertaining to implementing at least a portion of the at least one application update package, wherein the identifying information comprises one or more of at least one software unique identifier for the at least one cloud native application, at least one service tag for the at least one cloud native application, at least one serial number for the at least one cloud native application, and install base information for the at least one cloud native application;

to output, to at least one user device, at least one unique access key and one or more credentials for use in establishing connectivity via one or more user-connection gateways;

to output, to the at least one user device via the one or more user-connection gateways, (i) a request for automated remote action on at least one version of the at least one cloud native application implemented within at least one on-premise user environment associated with the at least one user device, and (ii) a notice indicating that the at least one manifest file is available, wherein the remote action relates to the at least one application update package, and wherein the request comprises at least one message associated with determining that a connection with the at least one user device is functional;

to process, via the one or more user-connection gateways, a response from the at least one user device approving the request for automated remote action;

to output, based at least in part on processing the response, the at least one manifest file to the at least one on-premise user environment associated with the at least one user device; and to initiate, in accordance with the at least one manifest file, automated implementation of the at least one application update package to the at least one version of the at least one cloud native application implemented within the at least one on-premise user environment.

14. The apparatus of claim 13, wherein the at least one processing device is further configured:

to obtain, from the at least one on-premise user environment, one or more of telemetry data and configuration information.

15. The apparatus of claim 14, wherein the at least one processing device is further configured:

to determine, for inclusion in the at least one application update package and based at least in part on the obtained telemetry data and/or obtained configuration information, at least one of one or more cloud native application patches and one or more cloud native application updates.

16. The apparatus of claim 13, wherein the at least one processing device is further configured:

to cache one or more container images related to one or more cloud native application updates common across one or more versions of the at least one cloud native application implemented within the at least one on-premise user environment.

17. The apparatus of claim 16, wherein generating the at least one application update package comprises validating each container image related to a cloud native application update by scanning each container image for one or more security vulnerabilities.

18. The apparatus of claim 13, wherein initiating automated implementation of the at least one application update package comprises initiating automated implementation of one or more of at least one artificial intelligence-machine learning model, at least one virtual application, and at least one container application.

19. The apparatus of claim 13, wherein the metadata associated with the at least one application update package comprise metadata in a JavaScript object notation format.

20. The apparatus of claim 13, wherein the one or more user-connection gateways comprise one or more virtual multi-way connections between at least one remote user device and at least one enterprise backend.

* * * * *